United States Patent
Wang et al.

(10) Patent No.: US 10,212,236 B2
(45) Date of Patent: Feb. 19, 2019

(54) INFORMATION TRANSMITTING METHOD AND APPARATUS IN ROBOT OPERATING SYSTEM

(71) Applicant: BEIJING BAIDU NETCOM SCIENCE AND TECHNOLOGY CO., LTD., Beijing (CN)

(72) Inventors: Haifeng Wang, Beijing (CN); Liming Xia, Beijing (CN); Jingchao Feng, Beijing (CN); Quan Wang, Beijing (CN); Ning Qu, Beijing (CN); Zhou Chen, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 218 days.

(21) Appl. No.: 15/428,972

(22) Filed: Feb. 9, 2017

(65) Prior Publication Data

US 2018/0048715 A1    Feb. 15, 2018

(30) Foreign Application Priority Data

Aug. 11, 2016    (CN) .......................... 2016 1 0656638

(51) Int. Cl.
| | |
|---|---|
| *G06F 15/177* | (2006.01) |
| *H04L 29/08* | (2006.01) |
| *G05D 1/00* | (2006.01) |
| *H04L 12/751* | (2013.01) |
| *G08C 17/00* | (2006.01) |
| *B25J 13/00* | (2006.01) |

(52) U.S. Cl.
CPC ......... *H04L 67/125* (2013.01); *G05D 1/0022* (2013.01); *G08C 17/00* (2013.01); *H04L 45/02* (2013.01); *B25J 13/006* (2013.01)

(58) Field of Classification Search
None
See application file for complete search history.

(56) References Cited

U.S. PATENT DOCUMENTS

| 8,683,047 B2 | 3/2014 | Han et al. | |
| 2002/0129274 A1* | 9/2002 | Baskey | G06F 9/544 726/1 |

(Continued)

FOREIGN PATENT DOCUMENTS

CN    101158936 A    4/2008

*Primary Examiner* — Phyllis A Book
(74) *Attorney, Agent, or Firm* — Seed IP Law Group LLP

(57) ABSTRACT

The present disclosure provides an information transmitting method and apparatus for use in a robot operating system. A specific implementation mode of the method comprises: acquiring to-be-transmitted information; determining a network relationship between a current node and an information receiving node receiving the to-be-transmitted information, the network relationship comprising a remote relationship and a local relationship; determining a transmission approach of the to-be-transmitted information according to a message transmission parameter, a configuration parameter and the network relationship; transmitting the to-be-transmitted information in the transmission approach. The implementation mode improves the information transmission efficiency of the robot operating system.

15 Claims, 5 Drawing Sheets

(56) References Cited

U.S. PATENT DOCUMENTS

| | | | | |
|---|---|---|---|---|
| 2004/0202165 | A1* | 10/2004 | Aoki | G06F 9/542 |
| | | | | 370/392 |
| 2006/0059282 | A1* | 3/2006 | Chaudhary | H04L 67/1097 |
| | | | | 710/100 |
| 2006/0075067 | A1* | 4/2006 | Blackmore | H04L 69/16 |
| | | | | 709/217 |
| 2006/0277285 | A1* | 12/2006 | Boyd | H04L 67/14 |
| | | | | 709/223 |
| 2012/0076492 | A1* | 3/2012 | Saleh | H04L 12/66 |
| | | | | 398/25 |
| 2014/0207281 | A1* | 7/2014 | Angle | H04L 12/282 |
| | | | | 700/257 |

* cited by examiner

INFORMATION TRANSMITTING METHOD AND APPARATUS IN ROBOT OPERATING SYSTEM

CROSS-REFERENCE TO RELATED APPLICATION

This application claims the priority of Chinese Patent Application No. 201610656638.X, entitled "Information Transmitting Method And Apparatus In Robot Operating System," filed on Aug. 11, 2016, the content of which is incorporated herein by reference in its entirety.

TECHNICAL FIELD

The present disclosure relates to the of data processing technology, specifically to the technical field of robot operating system technology, and more specifically to an information transmitting method and apparatus in a robot operating system.

BACKGROUND

Vehicles extend our travel reach, bring about convenience to our travel and improve our life quality. As the science and technology develop and advance, unmanned vehicles controlled by a smart system can acquire more travel information than manned vehicles, exhibit higher safety performance and become an important trend of vehicle development in the future.

However, current unmanned vehicles still have some drawbacks. The unmanned vehicle employs a robot operating system to transmit information, and through the collaboration and cooperation of artificial intelligence, visual computing, video camera, radar sensor, laser radar and positioning system, enables the unmanned vehicle to travel automatically and safely in unassisted situations. The robot operating system is a set of computer operating system frameworks purposefully designed for robot software development. A node manager of the robot operating system manages the communication between nodes. The communication between the nodes is called a topic. A subscriber of the topic is a topic receiving node, and an issuer of the topic is a topic issuing node. The unmanned vehicle usually comprises a sensor processing program node, a perception computing program node, a decision and control program node and the like. These program nodes perform, in real time, information transmission of a large amount of data such as images and point cloud, and have very high requirements for the information transmission capability of the vehicles. To this end, there exists a method for improving the communication capability of the unmanned vehicle through the use of plug-ins. This method lowers the information transmission pressure of the robot operating system. However, the communication using the plug-ins changes the communication rules in the original robot operating system and reduces the stability of the robot operating system per se. Meanwhile, using the plug-ins changes or replaces the communication interfaces of the original robot operating system so that the robot operating system can only select a single transmission approach reduces the information transmission compatibility of the robot operating systems, and ultimately limiting the information transmission efficiency of the robot operating systems.

SUMMARY

The present disclosure provides an information transmitting method and apparatus for use in a robot operating system to solve the technical problems mentioned in the Background.

In a first aspect, the present disclosure provides an information transmitting method for use in a robot operating system, the method comprising: acquiring to-be-transmitted information; determining a network relationship between a current node and an information receiving node receiving the to-be-transmitted information, the network relationship comprising a remote relationship and a local relationship; determining a transmission approach of the to-be-transmitted information based on a message transmission parameter, a configuration parameter and the network relationship, wherein the transmission approach is at least one of the following: a network interface transmission approach and a local shared memory transmission approach; the message transmission parameter is determined by a node manager of the robot operating system based on the network relationship, and the configuration parameter is determined by the node manager of the robot operating system according to the message transmission parameter to set information storage area for the corresponding transmission approach; transmitting the to-be-transmitted information in the transmission approach.

In some embodiments, the determining the network relationship between the current node and the information receiving node receiving the to-be-transmitted information comprises: transmitting a network relationship request, the network relationship request being configured to identify the network relationship between the current node and the information receiving node receiving the to-be-transmitted information; receiving the network relationship information corresponding to the network relationship request, the network relationship information being configured to characterize the network relationship between the current node and the information receiving node receiving the to-be-transmitted information.

In some embodiments, the determining a transmission approach of the to-be-transmitted information based on a message transmission parameter, a configuration parameter and the network relationship comprises: if the network relationship between the current node and the information receiving node receiving the to-be-transmitted information is the remote relationship, setting an information transmission buffer area for the to-be-transmitted information through the configuration parameter, and determining the transmission approach of the to-be-transmitted information as a network interface transmission approach through the message transmission parameter, the network interface transmission approach being configured to transmit the to-be-transmitted information to the information receiving node through the network; if the network relationship between the current node and the information receiving node receiving the to-be-transmitted information is the local relationship, setting a shared memory for the to-be-transmitted information through the configuration parameter, and determining the transmission approach of the to-be-transmitted information as a local shared memory transmission approach through the message transmission parameter, the shared memory being used for the current node to write the to-be-transmitted information and for the information receiving node to read the to-be-transmitted information, the local shared memory transmission approach being configured to implement information transmission with the information receiving node through the shared memory of the current node.

In some embodiments, the transmitting the to-be-transmitted information in the transmission approach comprises: if the transmission approach is the network interface transmission approach, buffering the to-be-transmitted information in the information transmission buffer area, then transmitting the to-be-transmitted information in the information transmission buffer area to the information receiving node through a network corresponding to the network interface transmission approach; if the transmission approach is the local shared memory transmission approach, buffering the to-be-transmitted information in the shared memory, and transmitting position information of the to-be-transmitted information on the shared memory to the node server.

In some embodiments, the buffering the to-be-transmitted information to the shared memory comprises: setting a flag bit for the to-be-transmitted information on the shared memory, the flag bit being configured to record read state information of the to-be-transmitted information, record information receiving node information of reading the to-be-transmitted information, and record reading time of reading the to-be-transmitted information.

In some embodiments, the method further comprises: a step of registering a current node to the robot operating system. The step of registering a current node to the robot operating system comprises: transmitting node information of the current node, the node information being used to register the current node to the node server of the robot operating system, and the node information comprising an IP address, hardware information and software information of the current node; receiving the message transmission parameter and the configuration parameter corresponding to the node information.

In a second aspect, the present disclosure provides an information transmitting apparatus for use in the robot operating system, the apparatus comprising: an information acquiring unit configured to acquire to-be-transmitted information; a network relationship determining unit configured to determine a network relationship between a current node and an information receiving node receiving the to-be-transmitted information, the network relationship comprising a remote relationship and a local relationship; a transmission approach determining unit configured to determine a transmission approach of the to-be-transmitted information based on a message transmission parameter, a configuration parameter and the network relationship, wherein the transmission approach is at least one of the following: a network interface transmission approach and a local shared memory transmission approach. The message transmission parameter is determined by a node manager of the robot operating system based on the network relationship, and the configuration parameter is determined by the node manager of the robot operating system according to the message transmission parameter to set information storage area for the corresponding transmission approach; an information transmitting unit configured to transmit the to-be-transmitted information in the transmission approach.

In some embodiments, the network relationship determining unit comprises: a network relationship request transmitting sub-unit configured to transmit a network relationship request, the network relationship request being configured to identify the network relationship between the current node and the information receiving node receiving the to-be-transmitted information; a network relationship information receiving sub-unit configured to receive network relationship information corresponding to the network relationship request, the network relationship information being configured to characterize network relationship between the current node and the information receiving node receiving the to-be-transmitted information.

In some embodiments, the transmission approach determining unit comprises: a network interface transmission sub-unit configured to, when the network relationship between the current node and the information receiving node receiving the to-be-transmitted information is the remote relationship, set an information transmission buffer area for the to-be-transmitted information through the configuration parameter, and determine the transmission approach of the to-be-transmitted information as a network interface transmission approach through the message transmission parameter, the network interface transmission approach being configured to transmit the to-be-transmitted information to the information receiving node through the network; a local shared memory transmission sub-unit configured to, when the network relationship between the current node and the information receiving node receiving the to-be-transmitted information is the local relationship, set a shared memory for the to-be-transmitted information through the configuration parameter, and determine the transmission approach of the to-be-transmitted information as a local shared memory transmission approach through the message transmission parameter, the shared memory being used for the current node to write the to-be-transmitted information and for the information receiving node to read the to-be-transmitted information, the local shared memory transmission approach being configured to implement information transmission with the information receiving node through the shared memory of the current node.

In some embodiments, the information transmitting unit comprises: a network transmission sub-unit configured to, when the transmission approach is the network interface transmission approach, buffer the to-be-transmitted information in the information transmission buffer area, then transmit the to-be-transmitted information in the information transmission buffer area to the information receiving node through a network corresponding to the network interface transmission approach; a local transmission sub-unit configured to, when the transmission approach is the local shared memory transmission approach, buffer the to-be-transmitted information in the shared memory, and transmit position information of the to-be-transmitted information on the shared memory to the node server.

In some embodiments, the local transmission sub-unit comprises a memory flag bit setting module configured to set a flag bit for the to-be-transmitted information on the shared memory, the flag bit being configured to record read state information of the to-be-transmitted information, record information receiving node information of reading the to-be-transmitted information, and record reading time of reading the to-be-transmitted information.

In some embodiments, the apparatus further comprises: a registration unit configured to register a current node to the robot operating system. The registration unit comprises a node information transmitting sub-unit configured to transmit node information of the current node, the node information being used to register the current node to the node server of the robot operating system, and the node information comprising an IP address, hardware information and software information of the current node; a node parameter receiving sub-unit configured to receive the message transmission parameter and the configuration parameter corresponding to the node information.

The information transmitting method and apparatus for use in the robot operating system provided by the present disclosure first determines the network relationship between the current node and the information receiving node, then determines the transmission approach of the to-be-transmitted information based on the message transmission parameter, the configuration parameter and the network relationship, and improves the information transmission efficiency.

BRIEF DESCRIPTION OF THE DRAWINGS

Other features, objectives and advantages of the present disclosure will be made more apparent by reading through detailed description of unrestrictive embodiments with reference to the following figures.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
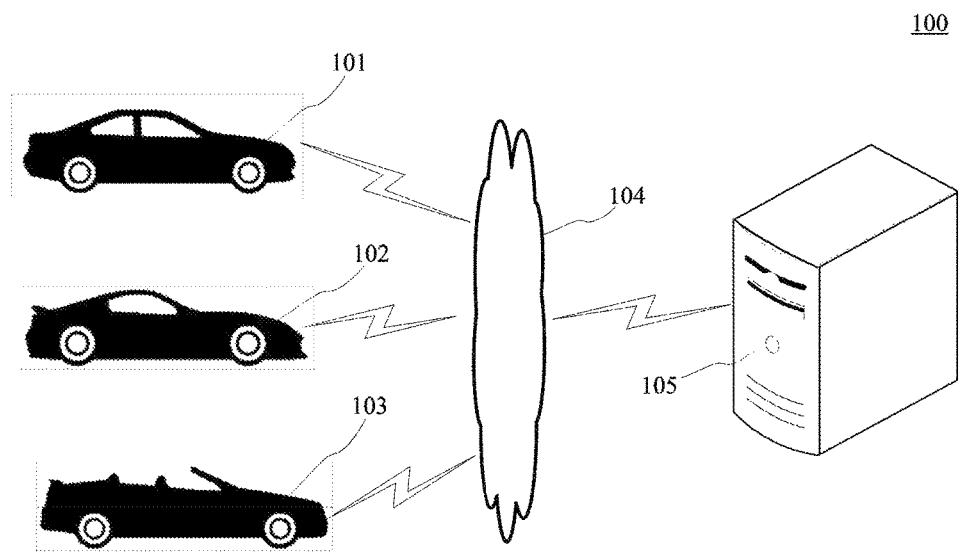
FIG. 1 is a diagram of an exemplary system architecture to which the present disclosure may be applied.

FIG. 1 illustrates a diagram of an exemplary system architecture 100 to which an information transmitting method for use in a robot operating system according to the present disclosure may be applied or to which an information transmitting apparatus for use in a robot operating system according to the present disclosure may be applied.

As shown in FIG. 1, the system architecture 100 may comprise unmanned vehicles 101, 102, 103, a network 104 and a server 105. The network 104 is configured to provide a communication link medium between the unmanned vehicles 101, 102, 103 and the server 105. The network 104 may comprise various connection types such as wired, wireless communication link or optical fiber cable or the like.

The unmanned vehicles 101, 102, 103 interact with the server 105 via the network 104 to receive or send a message or the like. The unmanned vehicles 101, 102, 103 may be installed with various communication client applications, for example, signal search application, information acquisition application, information analyzing and processing application, network communication application, information transmission application, information reception application and the like.

The unmanned vehicles 101, 102, 103 may be various vehicles having a display and being capable of receiving information or transmitting information, and comprise but are not limited to electrically-driven vehicles, oil-electricity hybrid vehicles, internal combustion engine vehicles and the like.

The server 105 may be a server for performing information transmission control for an information transmitting node and/or information receiving node on the unmanned vehicles 101, 102, 103, for example, a server for controlling an information transmission approach of the information transmitting node and/or information receiving node on the unmanned vehicles 101, 102, 103. The server 105 may adjust the transmission approach of the information transmitting node and/or information receiving node on the unmanned vehicles 101, 102, 103 and enable the information transmitting node and information receiving node to perform information delivery in a corresponding transmission approach.

It needs to be appreciated that the information transmitting method for use in a robot operating system according to an embodiment of the present disclosure is generally executed by the unmanned vehicles 101, 102, 103, and correspondingly, the information transmitting apparatus for use in a robot operating system is generally disposed in the unmanned vehicles 101, 102, 103.

It should be appreciated that the number of unmanned vehicles, network and server in FIG. 1 are only illustrative. There may be any number of unmanned vehicles, networks and servers according to needs in implementation.

Figure 2:
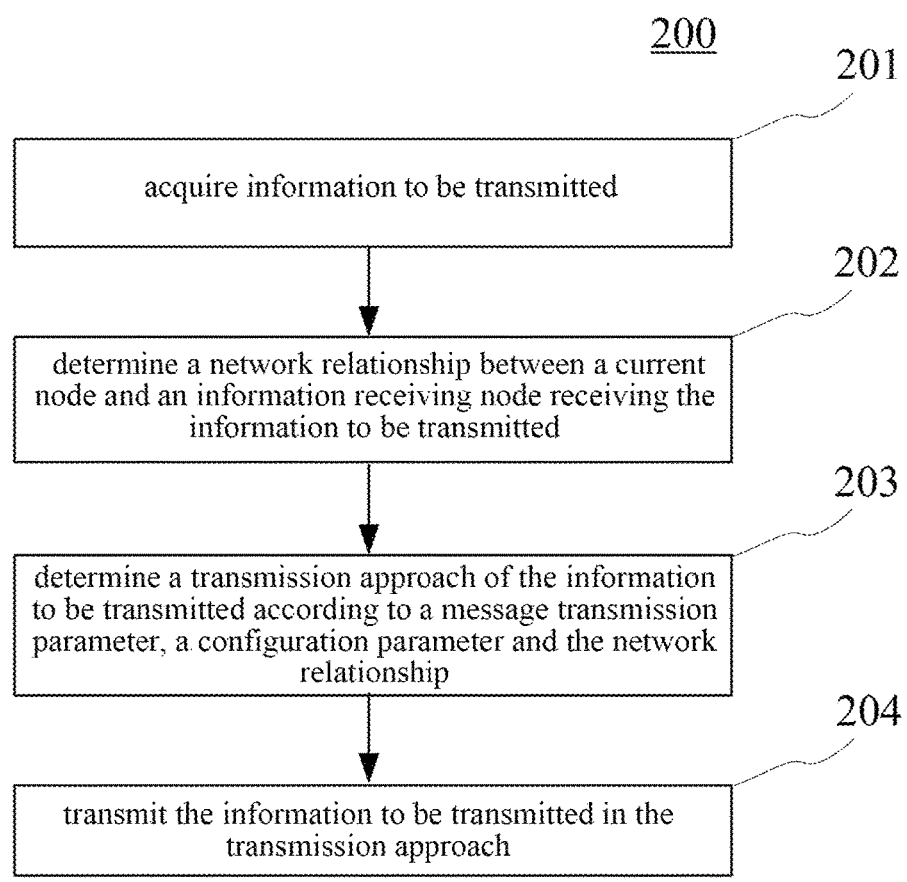
FIG. 2 is a flow chart of an embodiment of an information transmitting method for use in a robot operating system according to the present disclosure.

FIG. 2 is a flow chart 200 of an embodiment of an information transmitting method for use in a robot operating system according to the present disclosure. The information transmitting method for use in a robot operating system comprises:

Step 201: acquiring to-be-transmitted information.

The unmanned vehicles 101, 102, 103 maybe an information transmitting node (namely, topic issuing node) or an information receiving node (topic receiving node). When there are a plurality of apparatuses that need to perform information transmission in the unmanned vehicles 101, 102, 103, the unmanned vehicles 101, 102, 103 may meanwhile comprise the information transmitting node and information receiving node. The to-be-transmitted information (namely, the topic in the robot operating system) is usually information of periphery of the unmanned vehicles 101, 102, 103 acquired by a sensor on the unmanned vehicles 101, 102, 103, or other information generated by other equipment of the unmanned vehicles 101, 102, 103 according to the peripheral information acquired by the sensor. These information needs to be transmitted to other unmanned vehicles or to other devices belonging to the same unmanned vehicle. Since many electronic devices are provided on the unmanned vehicle, and usually in real collect and process information with massive data such as images and video, it is necessary to select the information transmission approach in the unmanned vehicle according to specific to-be-transmitted information, and the present implementation method is illustrated from the perspective of information transmitting node in the present embodiment.

In the present embodiment, the electronic device (e.g., the unmanned vehicle 101, 102, 103 as shown in FIG. 1) performs data delivery with the server 105 in a wired or wireless approach, and the server 105 is configured to control the information transmitting node and/or information receiving node on the unmanned vehicle 101, 102, 103 to perform information transmission.

Step 202: determining a network relationship between a current node and the information receiving node receiving the above to-be-transmitted information.

The unmanned vehicles 101, 102, 103 include many devices for information transmission, and meanwhile the unmanned vehicles 101, 102, 103 usually need to perform information communication with the server 105 or other unmanned vehicles 101, 102, 103. Since the unmanned vehicles 101, 102, 103 themselves process a very large amount of information and the network bandwidth connected with other unmanned vehicles 101, 102, 103 is usually limited, it is necessary to first determine the network relationship between the information transmitting node and the information receiving node, and thereby determine which information transmission approach is configured to perform information transmission. The network relationship comprises a remote relationship and a local relationship. In the present disclosure, the remote relationship means that the information transmitting node and the information receiving node are not on the same unmanned vehicle, the unmanned vehicle where the information transmitting node lies and the unmanned vehicle where the information receiving node lies may be different unmanned vehicles in the same region or different unmanned vehicles not in the same region; the local relationship means that the information transmitting node and information receiving node are at the same unmanned vehicle.

In some optional implementation modes of the present embodiment, the determining a network relationship between a current node and the information receiving node receiving the above to-be-transmitted information may comprise the following steps:

The first step: transmitting a network relationship request.

After receiving the to-be-transmitted information, the information receiving node can determine a device which the to-be-transmitted information needs to reach, namely, the information receiving node. When the information transmitting node cannot determine the network relationship with the information receiving node, the information receiving node sends a network relationship request to a node server of the robot operating system so that the node server provides the network relationship between the information transmitting node and the information receiving node which the to-be-transmitted information reaches, wherein the network relationship request is configured to recognize the network relationship between the current node and the information receiving node receiving the above to-be-transmitted information.

The second step: receiving network relationship information corresponding to the network relationship request.

After receiving the network relationship request, the node server queries for a network address of the information transmitting node and a network address of the information receiving node, and determines network relationship information between the information transmitting node and information receiving node according to the network addresses, wherein the network relationship information is configured to characterize network relationship between the transmitting node (current node) and the information receiving node receiving the to-be-transmitted information. The network relationship is usually determined with an Internet Protocol Address (briefly called IP address).

Usually, the above step is used when contact is established for the first time between the information transmitting node and the information receiving node, if subsequently there is further to-be-transmitted information between the information transmitting node and information receiving node, corresponding information transmission is performed according to the network relationship when contact is established for the first time. When the network relationship between the information transmitting node and information receiving node changes, it is necessary to re-determine the network relationship between the information transmitting node and information receiving node.

Step 203: determining a transmission approach of the to-be-transmitted information based on message transmission parameter, configuration parameter and the network relationship.

After the network relationship is determined, the node server, according to the network relationship between the information transmitting node and information receiving node, configures corresponding message transmission parameter and configuration parameter for the information transmitting node and information receiving node so that the to-be-transmitted information can efficiently is delivered between the information transmitting node and the information receiving node. The above transmission approach is at least one of the following: network interface transmission approach and local shared memory transmission approach. The message transmission parameter is determined by a node manager of the robot operating system based on the network relationship, and the configuration parameter is determined by the node manager of the robot operating system based on the message transmission parameter to set information storage area for the corresponding transmission approach.

In some optional implementation modes of the present embodiment, the network relationship comprises a remote relationship and a local relationship, and correspondingly the corresponding transmission approach needs to be determined based on different network relationship. The determining a transmission approach of the to-be-transmitted information based on message transmission parameter, configuration parameter and the network relationship may comprise:

1. If the network relationship between the current node and the information receiving node receiving the to-be-transmitted information is the remote relationship, the to-be-transmitted information can only be transmitted to the information receiving node via a network. An information transmission buffer area (namely, information storage area upon remote relationship) is set for the to-be-transmitted information through the configuration parameter, and the information transmission buffer area may be, according to size or type of the to-be-transmitted information, set in the local memory or local hard disk of the unmanned vehicle where the information transmitting node lies; the transmission approach of the to-be-transmitted information is determined as a network interface transmission approach through the message transmission parameter.

Wherein, the network interface transmission approach is configured to transmit the to-be-transmitted information to the information receiving node through the network.

2. If the network relationship between the current node and the information receiving node receiving the to-be-transmitted information is the local relationship, setting a shared memory (namely, information storage area upon the local relationship) for the to-be-transmitted information through the configuration parameter, and determining the transmission approach of the to-be-transmitted information as a local shared memory transmission approach through the message transmission parameter.

The shared memory is used for the information transmitting node (namely, the current node) to write the to-be-transmitted information and the information receiving node to read the to-be-transmitted information. The shared memory may be a relatively fixed storage area of the information transmitting node in the local memory of the unmanned vehicle. A starting position and an ending position of the storage area in the memory, and the size of the storage area may be dynamically determined according to a storage space occupied by the to-be-transmitted information. It is also feasible to directly set the shared memory as a fixed larger storage area. Specifically, whether the shared memory is determined dynamically or set as a fixed larger storage area depends on actual situations. The local shared memory transmission approach is configured to implement information transmission with the information receiving node through the shared memory of the current node.

When the information transmitting node and information receiving node are both at the same unmanned vehicle, the node server may further simultaneously set the network interface transmission approach and the local shared memory transmission approach for the information transmitting node and information receiving node, and the information transmitting node, according to the to-be-transmitted information, current network situations or current shared memory situations, decides on its own which transmission approach is configured to transmit the to-be-transmitted information to the information receiving node. For example, when the to-be-transmitted information occupies a very large amount of data (e.g., video, picture or the like) or other devices occupy the network, it is feasible to preferably use the shared memory approach to transmit information; when the shared memory is insufficient in space and the network is idle, it is feasible to choose to transmit the to-be-transmitted information through the network.

Step 204: transmitting the to-be-transmitted information in the above transmission approach.

After the transmission approach of the to-be-transmitted information is determined, the to-be-transmitted information is transmitted to the information receiving node in the corresponding transmission approach.

In some optional implementation modes of the present embodiment, the transmitting the to-be-transmitted information in the above transmission approach may comprise:

1. If the transmission approach is the network interface transmission approach, buffering the to-be-transmitted information in the information transmission buffer area, then transmitting the to-be-transmitted information in the information transmission buffer area to the information receiving node through a network corresponding to the network interface transmission approach, wherein the network may be a wired network or a wireless network.

2. If the transmission approach is the local shared memory transmission approach, buffering the to-be-transmitted information in the shared memory, and transmitting position information of the to-be-transmitted information on the shared memory to the node server. The node server locally stores the position information. When the information receiving node queries for corresponding information receiving node and to-be-transmitted information through the node server, the node server transmits the position information to the information receiving node, and the information receiving node, based on the position information, read corresponding to-be-transmitted information from the shared memory. The position information includes a starting position and an ending position of the to-be-transmitted information in the shared memory, and information in the storage area corresponding to the position information in the shared memory ready by the information receiving node is the to-be-transmitted information.

In addition, to ensure the to-be-transmitted information to be ready by the corresponding information receiving node, and also to improve a utilization rate of the shared memory, a flag bit is set for the to-be-transmitted information on the shared memory. The flag bit is configured to record read state information of the to-be-transmitted information, record information receiving node information of reading the to-be-transmitted information, and record reading time of reading the to-be-transmitted information. As such, it is feasible to check the information receiving node reading the to-be-transmitted information, and after the to-be-transmitted information being read, store other to-be-transmitted information in the shared memory to improve the utilization rate of the shared memory.

In some optional implementation modes of the present embodiment, the information transmitting node and information receiving node register to the robot operating system, and then the robot operating system enables information transmission between the information transmitting node and information receiving node. Hence, the method of the present embodiment further comprises: a step of registering a current node to the robot operating system. The step of registering the current node to the robot operating system may comprise the following steps:

The first step: transmitting node information of the current node.

The node information is configured to register the current node to the node server of the robot operating system, and the node information comprises an IP address, hardware information and software information of the current node.

The information transmitting node and information receiving node both need to respectively transmit respective node information to the node server of the robot operating system so that the node server determines the network relationship between the information transmitting node and information receiving node.

The second step: receiving message transmission parameter and configuration parameter corresponding to the node information.

The message transmission parameter is determined by the node server according to the above network relationship, and the configuration parameter is set by the node server based on the message transmission parameter.

After transmitting the node information to the node server, the node server can determine the network relationship between the information transmitting node and the information receiving node, and then respectively set message transmission parameter and configuration parameter for the information transmitting node and the information receiving node according to the to-be-transmitted information delivered between the information transmitting node and the information receiving node, or respective hardware information and software information of the information transmitting node and information receiving node.

It needs to be appreciated that the information transmitting node and the information receiving node are determined by the to-be-transmitted information, that is, the information transmitting node and the information receiving node are relative to each other. When a certain node transmits the to-be-transmitted information, the node is the information transmitting node; when a certain node receives the to-be-transmitted information, the node is the information receiving node.

Figure 3:
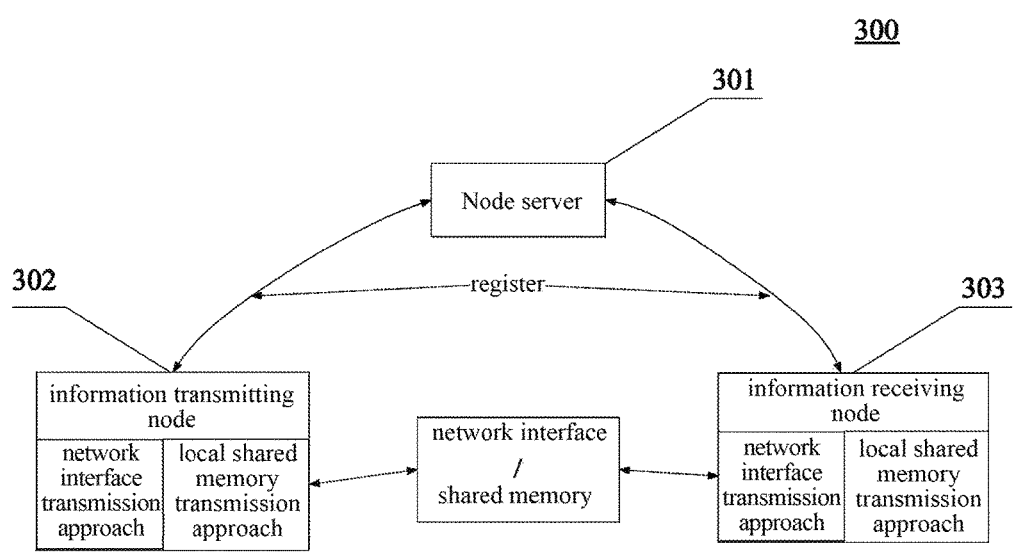
FIG. 3 is a schematic diagram of an application scenario of an embodiment of an information transmitting method for use in a robot operating system according to the present disclosure.

Further referring to FIG. 3, FIG. 3 is a schematic diagram of an application scenario of an information transmitting method for use in a robot operating system according to the present embodiment. As known from FIG. 3, the robot operating system of the present embodiment comprises a node server 301, an information transmitting node 302 and an information receiving node 303. When the to-be-transmitted information is transmitted, the information transmitting node 302 and information receiving node 303 respectively register to the node server 301, and the node server 301 stores the node information of the information transmitting node 302 and information receiving node 303. When the information transmitting node 302 receives the to-be-transmitted information, the information receiving node can be determined based on relevant information included by the to-be-transmitted information; then, the information transmitting node 302 sends a network relationship request to the node server 301 to request the node server 301 to determine the network relationship between the information transmitting node 302 and information receiving node 303; the node server 301 determines the network relationship between the information transmitting node 302 and information receiving node 303 according to IP addresses of the information transmitting node 302 and information receiving node 303, then configures message transmission parameter and configuration parameter respectively for the information transmitting node 302 and the information receiving node 303 based on respective hardware information and software information of the information transmitting node 302 and information receiving node 303, and transmits the message transmission parameter and the configuration parameter respectively to the information transmitting node 302 and information receiving node 303, and the information transmitting node 302 determines the transmission approach of the to-be-transmitted information based on the message transmission parameter, configuration parameter and network relationship. When the information transmitting node 302 and the information receiving node 303 are in a remote relationship, the information transmitting node 302 transmits the to-be-transmitted information to the information receiving node 303 via the network, and the information receiving node 303 directly receives the to-be-transmitted information; when the information transmitting node 302 and the information receiving node 303 are in a local relationship, the information transmitting node 302 writes the to-be-transmitted information in the shared memory, and transmits position information of the to-be-transmitted information saved in the shared memory to the node server 301; the information receiving node 303 queries to the node server 301 as to whether to receive the to-be-transmitted information, and thereby acquires the position information and read the to-be-transmitted information from a storage area in the shared memory corresponding to the position information. A flag bit in the storage area records read state information of the to-be-transmitted information, records information of the information receiving node 303, and records time of reading the to-be-transmitted information. The information transmitting node 302, based on the information recorded by the flag bit, determines whether the to-be-transmitted information has been successfully read by the information receiving node, and writes in next to-be-transmitted information. A reading speed of the shared memory is usually faster than a speed of transmitting information over the network, and is not interfered by various factors on the network. The size of the shared memory can be controlled flexibly. This can not only quicken information transmission efficiency, but also improve stability of information transmission and improve the utilization rate of the shared memory. In practice, when the information transmitting node 302 and the information receiving node 303 are in the local relationship, it is feasible to configure a network and shared memory for the information transmitting node 302 and information receiving node 303, and increase selectivity and flexibility of information delivery between the information transmitting node 302 and the information receiving node 303. Regarding some specific occasions, it is further feasible to compulsorily set the transmission approach between the information transmitting node 302 and information receiving node 303 through the node server 301, depending on actual needs.

The information transmitting method for use in the robot operating system provided by the present disclosure first determines the network relationship between the current node and the information receiving node, then determines the transmission approach of the to-be-transmitted information based on the message transmission parameter, the configuration parameter and the network relationship, and meanwhile improves the information transmission efficiency.

Figure 4:
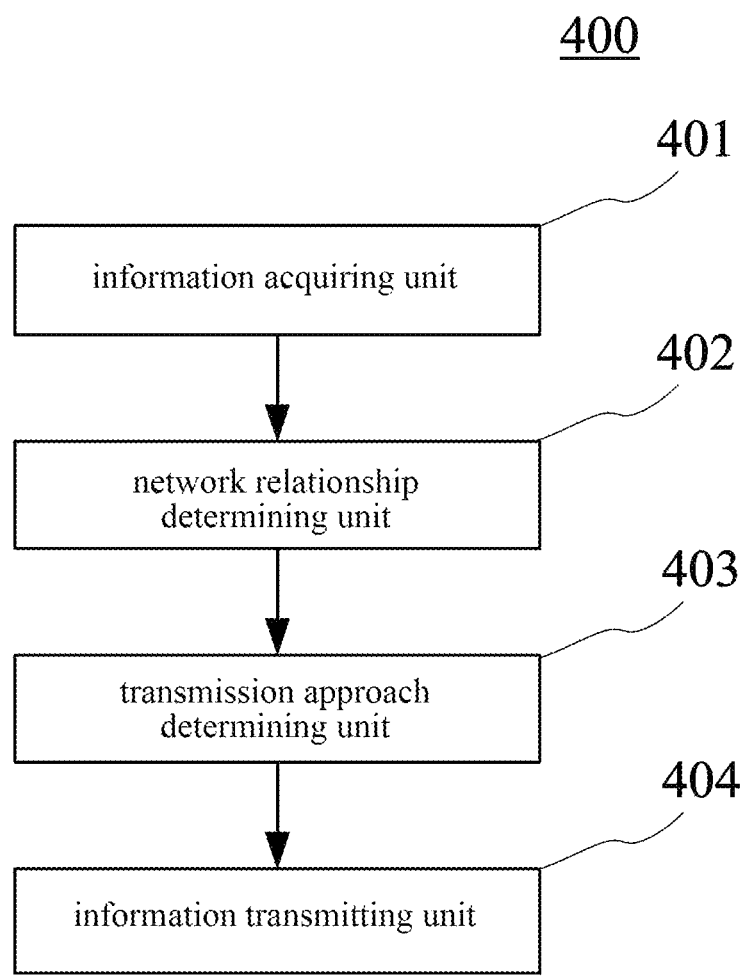
FIG. 4 is a structural schematic diagram of an embodiment of an information transmitting apparatus for use in a robot operating system according to the present disclosure.

Turning to FIG. 4, as implementation of the method shown in the above figures, the present disclosure provides an embodiment of an information transmitting apparatus for use in the robot operating system. The apparatus embodiment corresponds to the method embodiment shown in FIG. 2. The apparatus may be specifically applied to various electronic devices.

As shown in FIG. 4, the information transmitting apparatus 400 for use in the robot operating system according to the present embodiment may comprise: an information acquiring unit 401, a network relationship determining unit 402, a transmission approach determining unit 403 and an information transmitting unit 404, wherein the information acquiring unit 401 is configured to acquire to-be-transmitted information; the network relationship determining unit 402 is configured to determine the network relationship between the current node and the information receiving node receiving the to-be-transmitted information, the network relationship comprising a remote relationship and a local relationship; the transmission approach determining unit 403 is configured to determine the transmission approach of the to-be-transmitted information based on the message transmission parameter, the configuration parameter and the network relationship, wherein the above transmission approach is at least one of the following: a network interface transmission approach and a local shared memory transmission approach. The message transmission parameter is determined by a node manager of the robot operating system based on the network relationship, and the configuration parameter is determined by the node manager of the robot operating system based on the message transmission parameter to set information storage area for the corresponding transmission approach; the information transmitting unit 404 is configured to transmit the to-be-transmitted information in the transmission approach.

In some optional implementation modes of the present embodiment, the network relationship determining unit 402 may comprise: a network relationship request transmitting sub-unit (not shown in the figure) and a network relationship information receiving sub-unit (not shown in the figure). The network relationship request transmitting sub-unit is configured to transmit the network relationship request, and the network relationship request is configured to identify the network relationship between the current node and the information receiving node receiving the to-be-transmitted information; the network relationship information receiving sub-unit is configured to receive the network relationship information corresponding to the network relationship request, and the network relationship information is configured to characterize network relationship between the current node and the information receiving node receiving the to-be-transmitted information.

In some optional implementation modes of the present embodiment, the transmission approach determining unit 403 may comprise: a network interface transmission sub-unit (not shown in the figure) and a local shared memory transmission sub-unit (not shown in the figure). The network interface transmission sub-unit is configured to, when the network relationship between the current node and the information receiving node receiving the to-be-transmitted information is the remote relationship, set an information transmission buffer area for the to-be-transmitted information through the configuration parameter, and determine the transmission approach of the to-be-transmitted information as a network interface transmission approach through the message transmission parameter, the network interface transmission approach being configured to transmit the to-be-transmitted information to the information receiving node through the network; the local shared memory transmission sub-unit is configured to, when the network relationship between the current node and the information receiving node receiving the to-be-transmitted information is the local relationship, set a shared memory for the to-be-transmitted information through the configuration parameter, and determine the transmission approach of the to-be-transmitted information as a local shared memory transmission approach through the message transmission parameter, the shared memory being used for the current node to write the to-be-transmitted information and for the information receiving node to read the to-be-transmitted information, the local shared memory transmission approach being configured to implement information transmission with the information receiving node through the shared memory of the current node.

In some optional implementation modes of the present embodiment, the information transmitting unit 404 may comprise: a network transmission sub-unit (not shown in the figure) and a local transmission sub-unit (not shown). Wherein the network transmission sub-unit is configured to, when the transmission approach is the network interface transmission approach, buffer the to-be-transmitted information in the information transmission buffer area, then transmit the to-be-transmitted information in the information transmission buffer area to the information receiving node through a network corresponding to the network interface transmission approach; the local transmission sub-unit is configured to, when the transmission approach is the local shared memory transmission approach, buffer the to-be-transmitted information in the shared memory, and transmit position information of the to-be-transmitted information on the shared memory to the node server.

In some optional implementation modes of the present embodiment, the local transmission sub-unit may comprise a memory flag bit setting module (not shown in the figure) configured to set a flag bit for the to-be-transmitted information on the shared memory, the flag bit being configured to record read state information of the to-be-transmitted information, record information receiving node information of reading the to-be-transmitted information, and record reading time of reading the to-be-transmitted information.

In some optional implementation modes of the present embodiment, the information transmitting apparatus 400 may further comprise: a registration unit (not shown in the figure) configured to register a current node to the robot operating system. The registration unit comprises a node information transmitting sub-unit (not shown in the figure) and a node parameter receiving sub-unit (not shown in the figure). Wherein, the node information transmitting sub-unit is configured to transmit node information of the current node, the node information is used to register the current node to the node server of the robot operating system, and the node information comprises an IP address, hardware information and software information of the current node; the node parameter receiving sub-unit is configured to receive the message transmission parameter and the configuration parameter corresponding to the node information, the message transmission parameter is determined by the node server according to the above network relationship, and the configuration parameter is set by the node server based on the message transmission parameter.

Figure 5:
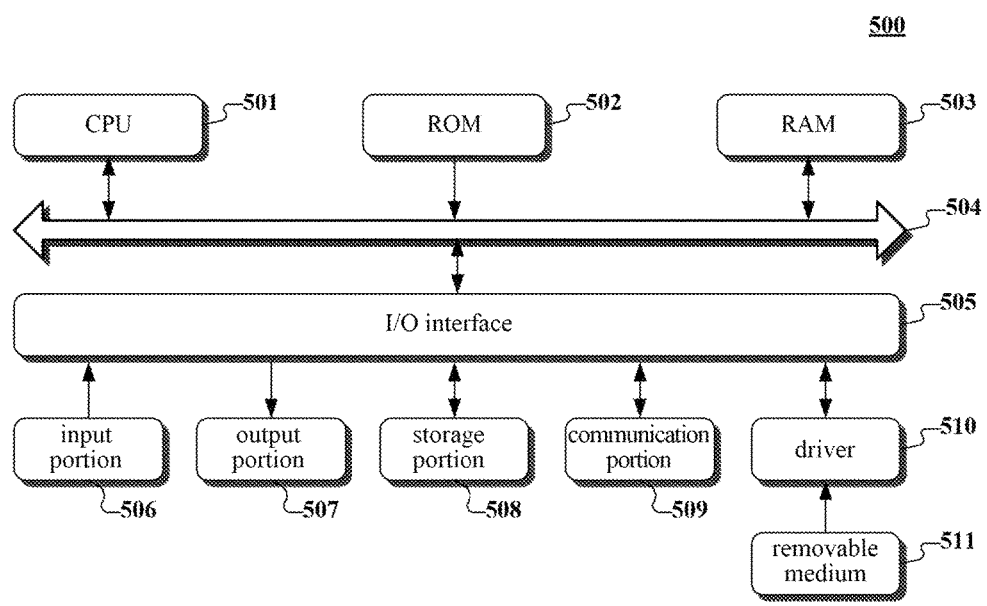
FIG. 5 is a structural schematic diagram of an embodiment of a controller of the present disclosure.

Referring to FIG. 5, a schematic structural diagram of a computer system 500 adapted to implement a server of the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present application.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising an acquiring unit, a downloading unit, a receiving unit, a parsing unit and a processing unit, where the names of these units or modules are not considered as a limitation to the units or modules. For example, the acquiring unit may also be described as "a unit for acquiring a slave station data reading rule table configured in a cloud by a user."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: acquire to-be-transmitted information; determine a network relationship between a current node and an information receiving node receiving the to-be-transmitted information, the network relationship comprising a remote relationship and a local relationship; determine a transmission approach of the to-be-transmitted information based on a message transmission parameter, a configuration parameter and the network relationship, wherein the transmission approach is at least one of the following: a network interface transmission approach and a local shared memory transmission approach; the message transmission parameter is determined by a node manager in the robot operating system based on the network relationship, and the configuration parameter is determined by the node manager of the robot operating system according to the message transmission parameter to set information storage area for the corresponding transmission approach; transmit the to-be-transmitted information using the transmission approach.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for transmitting information in a robot operating system of an unmanned vehicle, the method comprising:
   acquiring to-be-transmitted information;
   determining a network relationship between a current node and an information receiving node receiving the to-be-transmitted information, the network relationship comprising a remote relationship and a local relationship;
   determining a transmission approach of the to-be-transmitted information based on a message transmission parameter, a configuration parameter and the network relationship, wherein the transmission approach is at least one of the following: a network interface transmission approach and a local shared memory transmission approach; the message transmission parameter is determined by a node manager in the robot operating system based on the network relationship, and the configuration parameter is determined by the node manager of the robot operating system according to the message transmission parameter to set information storage area for the corresponding transmission approach, wherein the determining the transmission approach of the to-be-transmitted information according to the message transmission parameter, the configuration parameter and the network relationship comprises:
      setting an information transmission buffer for the to-be-transmitted information through the configuration parameter, if the network relationship between the current node and the information receiving node receiving the to-be-transmitted information is the remote relationship; and determining the transmission approach of the to-be-transmitted information as the network interface transmission approach through the message transmission parameter, the network interface transmission approach being configured to transmit the to-be-transmitted information to the information receiving node through the network;
      settle a shared memory for the to-be-transmitted information through the configuration parameter, if the network relationship between the current node and the information receiving node receiving the to-be-transmitted information is the local relationship; and determining the transmission approach of the to-be-transmitted information as the local shared memory transmission approach through the message transmission parameter, the shared memory being used for the current node to write the to-be-transmitted information and for the information receiving node to read the to-be-transmitted information, the local shared memory transmission approach being configured to implement information transmission with the information receiving node through the shared memory of the current node;
   transmitting the to-be-transmitted information using the transmission approach.

2. The method according to claim 1, wherein the determining the network relationship between the current node and the information receiving node receiving the to-be-transmitted information comprises:

transmitting a network relationship request, the network relationship request being configured to identify the network relationship between the current node and the information receiving node receiving the to-be-transmitted information;

receiving the network relationship information corresponding to the network relationship request, the network relationship information being configuredto characterize the network relationship between the current node and the information receiving node receiving the to-be-transmitted information.

3. The method according to claim 1, wherein the transmitting the to-be-transmitted information in the transmission approach comprises:

buffering the to-be-transmitted information in the information transmission buffer area, if the transmission approach is the network interface transmission approach; transmitting the to-be-transmitted information in the information transmission buffer area to the information receiving node through a network corresponding to the network interface transmission approach;

buffering the to-be-transmitted information in the shared memory, if the transmission approach is the local shared memory transmission approach; and transmitting position information of the to-be-transmitted information on the shared memory to the node server.

4. The method according to claim 3, wherein the buffering the to-be-transmitted information in the shared memory comprises:

setting a flag bit for the to-be-transmitted information in the shared memory, the flag bit being configured to record read state information of the to-be-transmitted information, information receiving node information of reading the to-be-transmitted information, and reading time of reading the to-be-transmitted information.

5. The method according to claim 1, wherein the method further comprises: registering a current node to the robot operating system, and wherein the registering the current node to the robot operating system comprises:

transmitting node information of the current node, the node information being used to register the current node to the node server of the robot operating system, and the node information comprising an IP address, hardware and software information of the current node; and receiving the message transmission parameter and the configuration parameter corresponding to the node information.

6. An information transmitting apparatus for use in a robot operating system of an unmanned vehicle; wherein the apparatus comprises:

at least one processor; and a memory storing instructions, which when executed by the at least one processor, cause the at least one processor to perform operations, the operations comprising:

acquiring to-be-transmitted information;

determining a network relationship between a current node and an information receiving node receiving the to-be-transmitted information, the network relationship comprising a remote relationship and a local relationship;

determining a transmission approach of the to-be-transmitted information based on a message transmission parameter, a configuration parameter and the network relationship, wherein the transmission approach is at least one of the following: a network interface transmission approach and a local shared memory transmission approach, the message transmission parameter is determined by a node manager of the robot operating system based on the network relationship, and the configuration parameter is determined by the node manager of the robot operating system according to the message transmission parameter to set information storage area for the corresponding transmission approach, wherein determining a transmission approach of the to-be-transmitted information based on a message transmission parameter, a configuration parameter and the network relationship comprises:

when the network relationship between the current node and the information receiving node receiving the to-be-transmitted information is the remote relationship, setting an information transmission buffer area for the to-be-transmitted information through the configuration parameter, and determine the transmission approach of the to-be-transmitted information as a network interface transmission approach through the message transmission parameter, the network interface transmission approach being configured to transmit the to-be-transmitted information to the information receiving node through the network;

when the network relationship between the current node and the information receiving node receiving the to-be-transmitted information is the local relationship, setting a shared memory for the to-be-transmitted information through the configuration parameter, and determine the transmission approach of the to-be-transmitted information as a local shared memory transmission approach through the message transmission parameter, the shared memory being used for the current node to write the to-be-transmitted information and for the information receiving node to read the to-be-transmitted information, the local shared memory transmission approach being configured to implement information transmission with the information receiving node through the share memory of the current node;

transmitting the to-be-transmitted information in the transmission approach.

7. The apparatus according to claim 6, wherein the determining a network relationship between a current node and an information receiving node receiving the to-be-transmitted information comprises:

transmitting a network relationship request, the network relationship request being configured to identify the network relationship between the current node and the information receiving node receiving the to-be-transmitted information;

receiving network relationship information corresponding to the network relationship request, the network relationship information being configured to characterize network relationship between the current node and the information receiving node receiving the to-be-transmitted information.

8. The apparatus according to claim 6, wherein the transmitting the to-be-transmitted information using the transmission approach comprises:

when the transmission approach is the network interface transmission approach, buffering the to-be-transmitted information in the information transmission buffer area, then transmitting the to-be-transmitted information in the information transmission buffer area to the information receiving node through a network corresponding to the network interface transmission approach;

when the transmission approach is the local shared memory transmission approach, buffering the to-be-transmitted information in the shared memory, and transmitting position information of the to-be-transmitted information on the shared memory to the node server.

9. The apparatus according to claim 8, wherein buffering the to-be-transmitted information in the shared memory, and transmitting position information of the to-be-transmitted information on the shared memory to the node server comprises:

setting a flag bit for the to-be-transmitted information on the shared memory, the flag bit being configured to record read state information of the to-be-transmitted information, record information receiving node information of reading the to-be-transmitted information, and record reading time of reading the to-be-transmitted Information.

10. The apparatus according to claim 6, wherein the operations further comprising:

register the current node to the robot operating system, the registering comprise:

transmitting node information of the current node, the node information being used to register the current node to the node server of the robot operating system, and the node information comprising an IP address, hardware information and software information of the current node;

receiving the message transmission parameter and the configuration parameter corresponding to the node information.

11. A non-transitory computer storage medium storing a computer program in a robot operating system of an unmanned vehicle, which when executed by one or more processors, cause the one or more processors to perform operations, the operations comprising:

acquiring to-be-transmitted information;

determining a network relationship between a current node and an information receiving node receiving the to-be-transmitted information, the network relationship comprising a remote relationship and a local relationship;

determining a transmission approach of the to-be-transmitted information based on a message transmission parameter, a configuration parameter and the network relationship, wherein the transmission approach is at least one of the following: a network interface transmission approach and a local shared memory transmission approach; the message transmission parameter is determined by a node manager in the robot operating system based on the network relationship, and the configuration parameter is determined by the node manager of the robot operating system according to the message transmission parameter to set information storage area for the corresponding transmission approach, wherein the determining the transmission approach of the to-be-transmitted information according to the message transmission parameter, the configuration parameter and the network relationship comprises:

setting an information transmission buffer for the to-be-transmitted information through the configuration parameter, if the network relationship between the current node and the information receiving node receiving the to-be-transmitted information is the remote relationship; and determining the transmission approach of the to-be-transmitted information as the network interface transmission approach through the message transmission parameter, the network interface transmission approach being configured to transmit the to-be-transmitted information to the information receiving node through the network;

setting a shared memory for the to-be-transmitted information through the configuration parameter, if the network relationship between the current node and the information receiving node receiving the to-be-transmitted information is the local relationship; and determining the transmission approach of the to-be-transmitted information as the local shared memory transmission approach through the message transmission parameter, the shared memory being used for the current node to write the to-be-transmitted information and for the information receiving node to read the to-be-transmitted information, the local shared memory transmission approach being configured to implement information transmission with the information receiving node through the shared memory of the current node;

transmitting the to-be-transmitted information using the transmission approach.

12. The non-transitory computer storage medium according to claim 11, wherein the determining the network relationship between the current node and the information receiving node receiving the to-be-transmitted information comprises:

transmitting a network relationship request, the network relationship request being configured to identify the network relationship between the current node and the information receiving node receiving the to-be-transmitted information;

receiving the network relationship information corresponding to the network relationship request, the network relationship information being configured to characterize the network relationship between the current node and the information receiving node receiving the to-be-transmitted information.

13. The non-transitory computer storage medium according to claim 11, wherein the transmitting the to-be-transmitted information in the transmission approach comprises:

buffering the to-be-transmitted information in the information transmission buffer area, if the transmission approach is the network interface transmission approach;

transmitting the to-be-transmitted information in the information transmission buffer area to the information receiving node through a network corresponding to the network interface transmission approach;

buffering the to-be-transmitted information in the shared memory, if the transmission approach is the local shared memory transmission approach; and transmitting position information of the to-be-transmitted information on the shared memory to the node server.

14. The non-transitory computer storage medium according to claim 13, wherein the buffering the to-be-transmitted information in the shared memory comprises:

setting a flag bit for the to-be-transmitted information in the shared memory, the flag bit being configured to record read state information of the to-be-transmitted information, information receiving node information of reading the to-be-transmitted information, and reading time of reading the to-be-transmitted information.

15. The non-transitory computer storage medium according to claim 11, wherein the method further comprises: registering a current node to the robot operating system, and wherein the registering the current node to the robot operating system comprises:

transmitting node information of the current node, the node information being used to register the current node to the node server of the robot operating system, and the node information comprising an IP address, hardware and software information of the current node; and receiving the message transmission parameter and the configuration parameter corresponding to the node information.

* * * * *

UNITED STATES PATENT AND TRADEMARK OFFICE
CERTIFICATE OF CORRECTION

Page 1 of 1

PATENT NO. : 10,212,236 B2
APPLICATION NO. : 15/428972
DATED : February 19, 2019
INVENTOR(S) : Haifeng Wang et al.

It is certified that error appears in the above-identified patent and that said Letters Patent is hereby corrected as shown below:

In the Claims

Column 17, Claim 2, Line 8:
"configuredto" should read --configured to--

Column 19, Claim 9, Line 22:
"Information." should read --information.--

Signed and Sealed this
Twenty-ninth Day of October, 2019

Andrei Iancu
*Director of the United States Patent and Trademark Office*